United States Patent

Halsey et al.

[11] Patent Number: 6,008,558
[45] Date of Patent: Dec. 28, 1999

[54] L-SHAPED MAGNETIC THRUST BEARING

[75] Inventors: David G. Halsey; Shin Katsumata; Michael G. Schneider, all of Rockford, Ill.

[73] Assignee: Sundstrand Corporation, Rockford, Ill.

[21] Appl. No.: 09/154,902

[22] Filed: Sep. 17, 1998

[51] Int. Cl.$^6$ .................................................. H02K 7/09
[52] U.S. Cl. ............................................................ 310/90.5
[58] Field of Search .......................................... 310/90.5

[56] References Cited

U.S. PATENT DOCUMENTS

| | | | |
|---|---|---|---|
| 3,909,082 | 9/1975 | Ishikawa | 308/10 |
| 4,948,348 | 8/1990 | Doll et al. | 417/365 |
| 5,027,280 | 6/1991 | Ando et al. | 364/474 |
| 5,068,558 | 11/1991 | Yamamura | 310/90.5 |
| 5,101,130 | 3/1992 | Jayawant et al. | 310/90.5 |
| 5,153,475 | 10/1992 | McSparran | 310/254 |
| 5,256,637 | 10/1993 | Rao | 505/1 |
| 5,315,197 | 5/1994 | Meeks et al. | 310/90.5 |
| 5,406,157 | 4/1995 | New | 310/95.5 |

FOREIGN PATENT DOCUMENTS

| | | | |
|---|---|---|---|
| 0 289 980 | 11/1987 | European Pat. Off. | F04D 7/02 |
| 0 311 122 | 4/1989 | European Pat. Off. | F16C 39/06 |
| 0 362881 | 4/1990 | European Pat. Off. | F16C 39/06 |
| 0411 696 A2 | 2/1991 | European Pat. Off. | F16C 32/04 |
| 0 584 846 | 3/1994 | European Pat. Off. | F16C 39/06 |
| 2 271 441 | 9/1973 | France | F16C 23/06 |
| 2452782 | 10/1980 | France | 310/90.5 |
| 1497 253 | 5/1970 | Germany | F16C 39/06 |
| 100940 | 3/1972 | Japan . | |
| 59-164416 | 1/1985 | Japan | F16C 39/06 |
| 1394334 | 7/1988 | Russian Federation | H02K 5/00 |
| 2 219 357 | 12/1989 | United Kingdom | F16C 32/04 |

*Primary Examiner*—Nestor Ramirez
*Assistant Examiner*—B Mullins
*Attorney, Agent, or Firm*—Leydig, Voit & Mayer, Ltd.

[57] ABSTRACT

An electromagnetic thrust bearing having reduced windage losses, improved structural integrity, and enhanced electromagnetic flux density. The present invention provides an electromagnetic thrust bearing having a first annular stator segment and a second annular stator segment joined thereto to define an annular electromagnetic coil chamber having an L-shaped cross-section. By employing first and second stator segments, the electromagnetic coil can be precision wound onto one segment without interference from the other segment, and then the two segments can be joined after the precision winding has been performed. The first segment is joined to the second segment at a location remote from the stator poles to thereby provide a more structurally sound assembly able to better withstand loads imposed thereon. The stator segment pole faces include axially extending lips to maximize electromagnetic flux density and thus load carrying capacity.

17 Claims, 2 Drawing Sheets

L-SHAPED MAGNETIC THRUST BEARING

TECHNICAL FIELD

The present invention generally relates to bearings, and more particularly relates to magnetic thrust bearings adapted to support a rotating body against thrust loads imparted parallel to the longitudinal axis of the rotating shaft.

BACKGROUND

Rotating shafts, such as those employed in motors, engines, compressors, generators, and the like, are often subjected to axial thrust loads. The thrust loads are axial in that they are directed parallel to the longitudinal axis of the rotating shaft.

Thrust bearings have therefore typically been employed to address such thrust loads and maintain proper axial positioning of the shaft. Thrust bearings are available in different forms including electromagnetic and conventional mechanical thrust bearings. With an electromagnetic thrust bearing a metal rotor is attached to the shaft subjected to the thrust loads. One or more stators, depending on the number of potential directions in which the axial thrust loads may be directed, are then disposed adjacent the rotor to generate magnetic flux. The magnetic flux acts against the metal rotor attached to the shaft and counteracts against the axial thrust loads to thereby maintain proper axial positioning of the shaft. U.S. Pat. Nos. 5,101,130 and 5,315,197 are indicative of typical electromagnetic thrust bearings of this type.

Jayawant et al '130 discloses an axial magnetic bearing suitable for use where high loads and high rotational speeds are found together. The bearings comprise an assembly where, for thrusts along the shaft in one direction, the shaft has in relation thereto, two axially spaced, and radially extending, thrust accepting faces, a generally channel-shaped, annular electromagnet surrounding the shaft, with a radially extending face of each pole of the electromagnet adjacent to an individually associated thrust face.

Meeks et al '197 discloses an electromagnetic thrust bearing which couples a rotatable member relative to a stationary member utilizing a combination of controllable electromagnets and a radially polarized permanent magnet, each physically associated with the stationary member. In one embodiment, the rotatable member comprises a shaft having a pair of axially spaced apart thrust discs fixed thereto. A pair of solenoids are disposed about the rotatable member between the spaced apart thrust discs on oppositely facing sides of the thrust discs. The solenoids are capable of generating a controllable electromagnetic field. An arcuate, radially polarized, permanent magnet is disposed between the solenoids to generate a constant flux, high density magnetic field between a solenoid housing and the thrust discs. In a second embodiment, a pair of solenoids are disposed about the rotatable member on opposite sides of a single thrust disc. A radially polarized permanent magnet is disposed between the solenoids radially outwardly from the thrust disc for generating a constant flux high density magnetic field between solenoid housings and the thrust disc. A sensor determines the axial positioning of the rotatable member relative to the stationary member and provides input for controlling the positioning of the thrust discs by varying the magnetic flux generated by the solenoids.

At high rotational shaft speeds, an electromagnetic bearing rotor may experience structural fatigue and failure. It would therefore be desirable to reduce the diameter of the bearing rotor in such high speed applications. However, the degree to which the diameter can be lessened is, in part, limited by axial thrust loads to which the shaft is subjected. If the axial thrust load is relatively high, the flux path area and the magnetic flux generated by the bearing will necessarily need to be relatively high. This in turn requires a larger electromagnetic coil. Since the poles of the electromagnetic bearing are ideally located at the innermost and outermost radii of the rotor, the larger electromagnetic coil requires a higher diameter rotor, which as indicated above is prone to structural fatigue and failure at high rotational speeds.

Systems have therefore been developed which provide a sufficiently sized electromagnetic coil to counterbalance axial thrust loads, but which also decrease the physical gap between the stator poles, and thereby allow for a decreased diameter rotor. For example, U.S. Pat. No. 5,406,157 discloses an electromagnetic bearing arrangement wherein the stator includes radially inner and outer segments with a groove therebetween for receipt of the electromagnetic coil. The open ends of the radially inner and outer segments define the poles of the electromagnetic bearing, with the open end of the radially outer segment being tapered radially inward to decrease the distance between the poles and thereby allow for a decrease in the outer diameter of the rotor.

While such a system does allow for a reduced diameter rotor, a need exists for a more structurally rigid stator which is able to withstand greater loads and "oil-canning". In addition, a need exists for an electromagnetic coil which maximizes the density of the individual turns of the electromagnetic coil within the stator, and thereby maximizes the electromagnetic flux generated by the bearing. Moreover, a need exists for an electromagnetic bearing which maximizes the electromagnetic flux density of the bearing directly at the inner and outer peripheries of the rotor attached to the shaft. Furthermore, such needs must be addressed while decreasing the distance between the stator poles to thereby decrease windage losses and increase the efficiency of the bearing.

SUMMARY

It is therefore an objective of the present invention to provide an electromagnetic thrust bearing having a stator with enhanced structural rigidity to better withstand loads imposed thereon.

It is another objective of the present invention to provide an electromagnetic bearing and method for manufacturing same which allows for maximizing the density of the individual turns of the electrical coil provided within the stator.

It is still another objective of the present invention to provide an electromagnetic bearing which maximizes the electromagnetic flux density generated at the inner and outer peripheries of the rotor.

It is a still further objective of the present invention to provide an electromagnetic bearing wherein the distance between the stator poles, and thus the rotor thrust disk outer diameter, is minimized to reduce windage losses and increase efficiency.

In accordance with these objectives, it is a feature of the present invention to provide an electromagnetic thrust bearing of the type adapted to generate magnetic flux to support a rotating shaft against thrust loads parallel to the longitudinal axis of the shaft. The magnetic flux is adapted to interact with a rotor attached to the rotating shaft to thereby support the rotating shaft against the thrust loads parallel to the longitudinal axis of the shaft. The magnetic thrust bearing comprises a first annular stator member, a second annular stator member and an electromagnetic coil provided therebetween. The first annular stator segment includes a first side parallel to the rotating shaft, and a second side disposed perpendicular to the first side and extending radially outward from the rotating shaft with the second side having a radially outer end. The second annular stator segment includes a first side joined to the first stator segment second side radially outer end and parallel to the rotating shaft, a second side joined to the second stator segment first side and parallel to the first stator segment second side, and a third side joined to the second stator segment second side and radially inward of and parallel to the second stator segment first side. The first annular stator segment and the second annular stator segment form an annular coil chamber having an L-shaped cross-section. The annular electromagnetic coil has an L-shaped cross-section and is wound within the annular coil chamber having an L-shaped cross section. The electromagnetic coil is adapted to create the magnetic flux to support the rotating shaft against thrust loads parallel to the longitudinal axis of the shaft.

It is another feature of the present invention to provide an electromagnetic thrust bearing as described above wherein the third side of the second annular stator segment includes first and second ends with the first end being formed integrally with the second side of the second annular stator segment and the second end is proximate the rotor attached to the rotating shaft. The second end has a lower cross-sectional area than the first end to thereby focus lines of the magnetic flux directly at a radially outer periphery of the rotor attached to the rotating shaft.

It is still another feature of the present invention to provide an electromagnetic thrust bearing as described above wherein the electromagnetic coil includes a plurality of individual turns and is precision wound within the annular coil chamber such that the density of the individual turns within the coil chamber is maximized.

It is still another feature of the present invention to provide a method of manufacturing an electromagnetic thrust bearing of the type adapted to support a rotating shaft against thrust loads parallel to the longitudinal axis of the rotating shaft. The method of manufacturing comprises the steps of: providing a first annular stator segment having a first side parallel to the rotating shaft, and a second side disposed perpendicular to the first side and extending radially outward from the rotating shaft, the second side having a radially outer end; winding an annular electromagnetic coil having an L-shaped cross-section around the first annular stator, the electromagnetic coil being adapted to create the magnetic flux to support the rotating shaft against thrust loads parallel to the longitudinal axis of the shaft; joining a second annular stator segment to the first annular stator segment, the second annular stator segment having a first side joined to the first stator segment second side radially outer end and being parallel to the rotating shaft, a second side joined to the second stator segment first side and being parallel to the first stator segment second side, and a third side joined to the second stator segment second side and being radially inward of and parallel to the second stator segment first side, the first annular stator segment and the second annular stator segment defining an annular coil chamber having an L-shaped cross-section housing the electromagnetic coil therein, the third side of the second annular stator segment including first and second ends with the first end being formed integrally with the second side of the second annular stator segment and the second end being proximate the rotor attached to the rotating shaft; and angling the second end of the third side to thereby maximize electromagnetic flux density at a radially outer periphery of the rotor attached to the rotating shaft.

These and other objectives and features will be most completely and beneficially understood as explained in the following detailed description when read and comprehended in conjunction with the accompanying drawings.

While the present invention is described below with reference to certain preferred embodiments, it is to be understood that such embodiments are chosen for the express purpose of disclosing the best mode of the present invention, and should in no way be construed to limit the scope of the invention to such specifically disclosed embodiments. Rather, the present invention is intended to cover all embodiments of the present invention as specifically described herein, reasonably taught hereby, and falling within the scope of the claims appended hereto.

DESCRIPTION OF THE INVENTION

Figure 1:
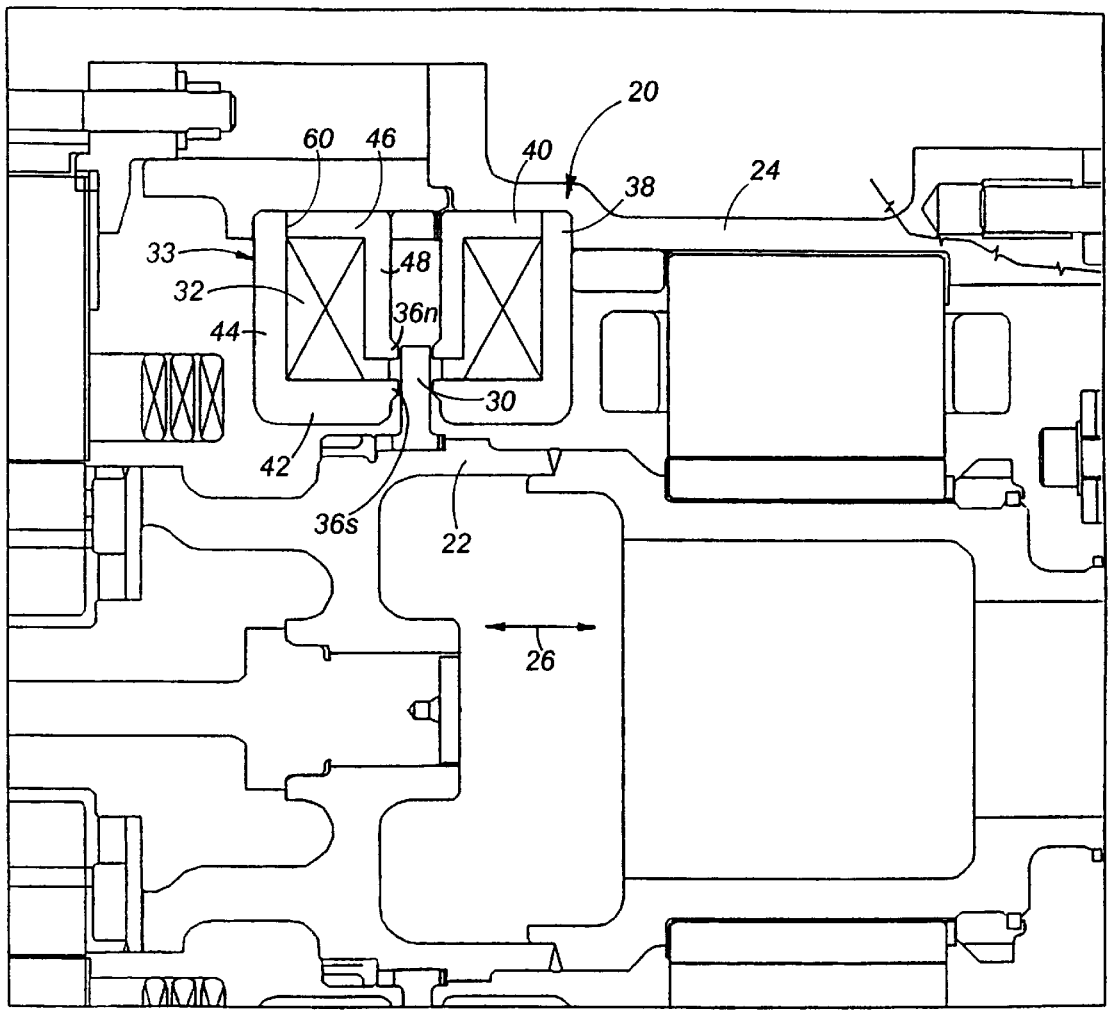
FIG. 1 is a sectional view of the preferred embodiment of the present invention.

Referring now to FIG. 1, the present invention is generally designated as a electromagnetic bearing assembly 20. For purposes of illustration only, the shaft 22 supported by electromagnetic bearing assembly 20, and the housing 24 enclosing electromagnetic bearing assembly 20 are depicted as well. However, it is to be understood that such depictions are for the purposes of illustration and environment only, and form no part of the patentable subject matter disclosed and claimed herein.

As stated above, shaft 22 can sometimes be subjected to axial thrust loads generated in the directions identified by bidirectional arrow 26. While shaft 22 is supported for rotation by radial bearings (not shown), such bearings provide no means by which such thrust loads can be countered without detrimentally affecting the rotation of shaft 22, or the machine to which shaft 22 is connected. Bearing assembly 20 is therefore provided to address the axial thrust loads and maintain proper axial positioning of shaft 22.

Figure 2:
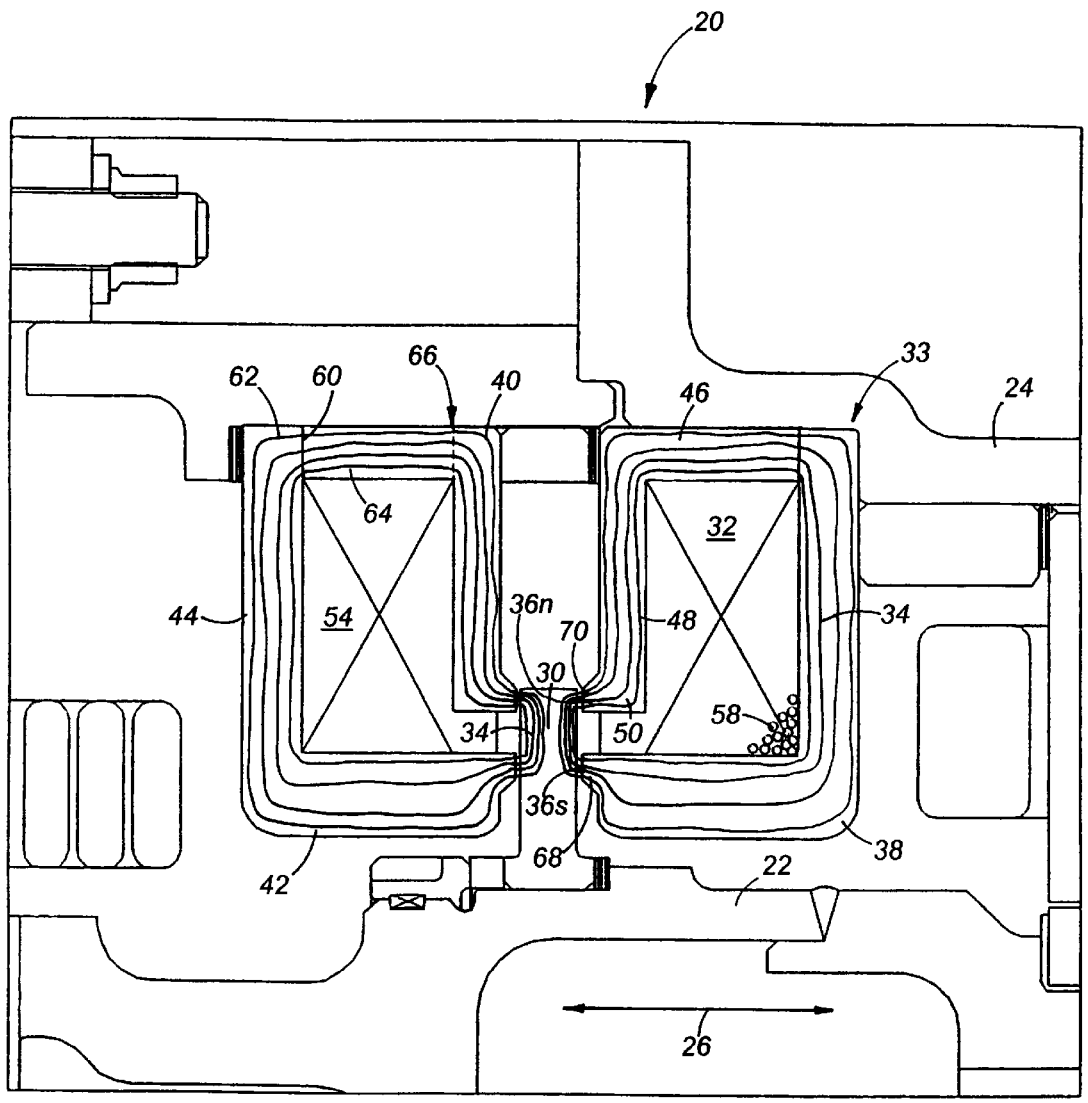
FIG. 2 is an enlarged sectional view of the preferred embodiment of the present invention.

Such axial positioning is maintained through the generation of magnetic flux through which rotor 30 rotates. As best shown in FIG. 2, bearing assembly 20 includes an electromagnetic coil 32 wound within stator 33 and which is connected to a source of electrical power (not shown). As will be readily understood by those of ordinary skill in the art, the flow of current through coil 32 causes the generation of magnetic flux, indicated by lines 34. As also depicted in FIG. 2, the rotor 30 cuts through magnetic flux 34 as shaft 22 rotates. Since rotor 30 is manufactured from a ferrous metal, magnetic flux 34 attracts rotor 30 toward stator 33. More specifically, stator 33 includes first and second poles 36N. and 36S., which generate a magnetic force to act on rotor 30. Depending on the direction of the thrust load, one or two stator assemblies 20 can be positioned on one or both sides of rotor 30, to thereby generate magnetic flux to attract rotor 30 in both axial directions and maintain proper axial positioning of shaft 22.

As described above, one of the objectives of the present invention is to position stator poles 36N. and 36S. radially inward as far as possible to thereby allow the outer diameter of rotor 30 to be as small as possible. This in turn enables the rotor 30 to maintain structural integrity even at the elevated rotational speeds with which rotor 30 is required to rotate. In addition, it is an objective of the present invention to provide the poles 36N. and 36S. as close together as possible to reduce windage losses and thereby produce a more efficient machine.

Both of these objectives are accomplished by the present invention through the use of inventive stator segments 38 and 40. As best shown in FIG. 2, stator segment 38 includes an axially parallel leg 42 and a radially extending leg 44 which, in the preferred embodiment, are integrally formed together. It can also be seen that stator segment 40 includes radially outer and axially parallel leg 46, radially extending leg 48, and radially inner and axially parallel leg 50. Legs 46, 48, and 50 are also integrally formed together. The two distinct rotor segments therefore combine, in the preferred embodiment, to form stator 33.

When stator segments 38 and 40 are combined, it can be seen that annular channel 54 is formed, which channel is L-shaped in cross-section. However, by providing stator 33 in two such shaped segments, electromagnetic coil 32 can be precision wound onto one segment, to thereby maximize the density of individual wire turns 58. Referring now to FIG. 2, it can be seen that coil 32 can be wound onto stator segment 38, for example, and then stator segment 40 can be attached thereto. As used herein, "precision winding" is intended to mean a winding process by which individual wire turns 58 are wound in layers in parallel disposition, and then subsequent layers are wound in similarly parallel disposition so as to occupy the interstices provided between individual wire turns.

Stator segments 38 and 40 are attached, as by methods including, but not limited to, welding, at joint 60 between end 62 of segment 38, and end 64 of segment 40. In so doing, stator 33 is better able to withstand the load generated by rotor 30 cutting through magnetic flux 34. With prior art devices, the legs of the stator are either integrally formed together, and therefore do not lend themselves to a precision winding process, or are joined together at a position proximate rotor 30 (see area 66 identified in FIG. 2), which results in a less structurally rigid stator. A phenomenon known as "oil-canning" can therefore result wherein the force generated by the magnetic flux as rotor 30 rotates and shaft 22 is subjected to axial thrust, can cause distortion or breakage of stator 33. More specifically, if the joint between the two stator segments were to be provided at, for example, area 66, the operation of bearing assembly 20 could generate sufficient force to cause the stator segment proximate the rotor to move radially outward. By providing the joint 60 at an outside corner of stator 52, and providing the planar face of joint 60 parallel to rotor 30, the force generated during operation will only cause stator segment 40 to act perpendicularly against stator segment 38. Such a joint disposition is therefore better suited to avoiding oil-canning than is a joint which is disposed closer to rotor 30 with the face of the joint parallel to the rotor.

Another inventive feature of the present invention is provided through the use of lip 68 of stator segment 38, and lip 70 of stator segment 40. With prior art magnetic bearings, the stator pole faces are typically provided with a cross-sectional area equal to the cross-sectional area of the stator legs; and as a result, the lines of magnetic flux 34 emanating from poles 36N. and 36S. are directed at a relatively large surface area of rotor 30. This results in relatively high windage losses in that the outermost portions of the poles are relatively far apart. However, through the use of lips 68 and 70, the lines of magnetic flux 34 are more focused and produce relatively tight lines of magnetic flux which are relatively close together. At this point, it is important to understand the magnetic force is proportional to "flux density" squared (i.e. (number of flux lines÷square inches)$^2$). Thus the area required to carry the thrust load is greatly reduced and this in turn is able to reduce windage losses and result in a smaller diameter rotor thus having greater structural integrity. Moreover, lips 68 and 70 allow bearing 20 to produce a load carrying capacity substantially greater than has heretofore been possible with similarly sized, conventional magnetic bearings.

It can also be seen that channel 54 formed by stator segments 38 and 40 is substantially filled with electromagnetic coil 32. Channel 54 and coil 32 therefore both have an "L" shaped cross section. In so doing, the number of individual wire turns 58 provided within channel 54 is increased to thereby produce a level of magnetic flux which is able to resist substantially greater axial thrust loads for the relative size of bearing assembly 20. With prior art devices, the outer diameter of the bearing assembly and thus the outer diameter of the rotor would have to be significantly larger in order to resist similar levels of axial thrust.

While not depicted, it is to be understood that bearing assembly 20, in preferred embodiments, can be comprised of a number of arcuate sections disposed radially about shaft 22, or can be a single piece. The arcuate sections are disposed in an annular orientation to provide resistance against axial thrust loads around the entire circumference of shaft 22 and rotor 30.

It can therefore be appreciated by those of ordinary skill in the art that the present invention brings to the art a new and improved electromagnetic thrust bearing with enhanced structural integrity, reduced windage losses, and increased load carrying capacity. While the present invention has been described in terms of its preferred embodiment, it should be understood that numerous modifications may be made thereto without departing from the spirit and scope of the present invention. It is intended that the present invention should include not only the specific embodiments disclosed, supra, but also any embodiments equivalent thereto, reasonably taught thereby, or falling within the scope of the appended claims.

We claim:

1. An annular electromagnetic thrust bearing of the type adapted to generate magnetic flux to support a rotating shaft against thrust loads parallel to the longitudinal axis of the shaft, the magnetic flux adapted to interact with a rotor attached to the rotating shaft to thereby support the rotating shaft against the thrust loads parallel to the longitudinal axis of the shaft, the magnetic thrust bearing comprising:

a first annular stator segment having a first side parallel to the rotating shaft, and a second side disposed perpendicular to the first side and extending radially outward from the rotating shaft, the second side having a radially outer end;

a second annular stator segment having a first side joined to the first stator segment second side radially outer end and being parallel to the rotating shaft, a second side joined to the second stator segment first side and being parallel to the first stator segment second side, and a third side joined to the second stator segment second side and being radially inward of and parallel to the second stator segment first side, the first annular stator segment and the second annular stator segment forming an annular coil chamber having an L-shaped cross-section; and an annular electromagnetic coil having an L-shaped cross-section wound within the annular coil chamber having an L-shaped cross section, the electromagnetic coil being adapted to create the magnetic flux to support the rotating shaft against thrust loads parallel to the longitudinal axis of the shaft.

2. The electromagnetic thrust bearing of claim 1 wherein the electromagnetic coil includes a plurality of individual turns and is precision wound within the annular coil chamber such that the density of the individual turns within the coil chamber is maximized.

3. The electromagnetic thrust bearing of claim 1 wherein the first stator segment is joined to the second stator segment by welding.

4. The electromagnetic thrust bearing of claim 1 wherein first and second electromagnetic thrust bearings flank the shaft rotor to support the shaft against thrust loads in opposite directions parallel to the longitudinal axis of the shaft.

5. The electromagnetic thrust bearing of claim 1 wherein the third side of the second annular stator segment includes first and second ends with the first end being formed integrally with the second side of the second annular stator segment and the second end being proximate the rotor attached to the rotating shaft, the second end having a lower cross sectional area than the first end to thereby focus lines of the magnetic flux directly at a radially outer periphery of the rotor attached to the rotating shaft.

6. The electromagnetic thrust bearing of claim 1 wherein the first annular stator segment first side and second annular stator segment third side are positioned relatively close so as to reduce windage losses.

7. An annular electromagnetic thrust bearing of the type adapted to generate magnetic flux to support a rotating shaft against thrust loads parallel to the longitudinal axis of the shaft, the magnetic flux adapted to interact with a rotor attached to the rotating shaft to thereby support the rotating shaft against the thrust loads parallel to the longitudinal axis of the shaft, the magnetic thrust bearing comprising:

a first annular stator segment having a first side parallel to the rotating shaft, and a second side disposed perpendicular to the first side and extending radially outward from the rotating shaft, the second side having a radially outer end;

a second annular stator segment having a first side joined to the first stator segment second side radially outer end and being parallel to the rotating shaft, a second side joined to the second stator segment first side and being parallel to the first stator segment second side, and a third side joined to the second stator segment second side and being radially inward of and parallel to the second stator segment first side, the first annular stator segment and the second annular stator segment forming an annular coil chamber having an L-shaped cross-section;

an annular electromagnetic coil having an L-shaped cross-section wound within the annular coil chamber having an L-shaped cross section, the electromagnetic coil being adapted to create the magnetic flux to support the rotating shaft against thrust loads parallel to the longitudinal axis of the shaft; and the electromagnetic thrust bearing including a plurality of arcuate sections disposed in annular orientation, each arcuate section including the first stator segment, the second stator segment, and the electromagnetic coil.

8. A method of manufacturing an electromagnetic thrust bearing of the type adapted to support a rotating shaft against thrust loads parallel to the longitudinal axis of the rotating shaft, the method of manufacturing comprising the steps of:

providing a first annular stator segment having a first side parallel to the rotating shaft, and a second side disposed perpendicular to the first side and extending radially outward from the rotating shaft, the second side having a radially outer end;

winding an annular electromagnetic coil having an L-shaped cross-section around the first annular stator, the electromagnetic coil being adapted to create the magnetic flux to support the rotating shaft against thrust loads parallel to the longitudinal axis of the shaft;

joining a second annular stator segment to the first annular stator segment, the second annular stator segment having a first side joined to the first stator segment second side radially outer end and being parallel to the rotating shaft, a second side joined to the second stator segment first side and being parallel to the first stator segment second side, and a third side joined to the second stator segment second side and being radially inward of and parallel to the second stator segment first side, the first annular stator segment and the second annular stator segment defining an annular coil chamber having an L-shaped cross-section housing the electromagnetic coil therein, the third side of the second annular stator segment including first and second ends with the first end being formed integrally with the second side of the second annular stator segment and the second end being proximate the rotor attached to the rotating shaft; and angling the second end of the third side to thereby maximize electromagnetic flux density at a radially outer periphery of the rotor attached to the rotating shaft.

9. The method of claim 8 wherein the angling step results in the second end of the third side having a lower cross sectional area than the first end.

10. The method of claim 8 wherein the joining step is performed by welding the second annular stator segment to the first annular stator segment.

11. The method of claim 8 wherein the electromagnetic coil includes a plurality of individual turns and the winding step includes the step of precision winding the turns within the annular coil chamber such that the density of the individual turns within the coil chamber is maximized.

12. The method of claim 8 further including the step of positioning the first annular stator segment first side close to the second annular stator segment third side so as to reduce windage losses.

13. A method of manufacturing an electromagnetic thrust bearing of the type adapted to support a rotating shaft against thrust loads parallel to the longitudinal axis of the rotating shaft, the method of manufacturing comprising the steps of:

providing a first annular stator segment having a first side parallel to the rotating shaft, and a second side disposed perpendicular to the first side and extending radially outward from the rotating shaft, the second side having a radially outer end;

winding an annular electromagnetic coil having an L-shaped cross-section around the first annular stator, the electromagnetic coil being adapted to create the magnetic flux to support the rotating shaft against thrust loads parallel to the longitudinal axis of the shaft;

joining a second annular stator segment to the first annular stator segment, the second annular stator segment having a first side joined to the first stator segment second side radially outer end and being parallel to the rotating shaft, a second side joined to the second stator segment first side and being parallel to the first stator segment second side, and a third side joined to the second stator segment second side and being radially inward of and parallel to the second stator segment first side, the first annular stator segment and the second annular stator segment defining an annular coil chamber having an L-shaped cross-section housing the electromagnetic coil therein, the third side of the second annular stator segment including first and second ends with the first end being formed integrally with the second side of the second annular stator segment and the second end being proximate the rotor attached to the rotating shaft, the electromagnetic thrust bearing including a plurality of arcuate sections disposed in annular orientation, each arcuate section including the first stator segment, the second stator segment, and the electromagnetic coil; and angling the second end of the third side to thereby maximize electromagnetic flux density at a radially outer periphery of the rotor attached to the rotating shaft.

14. An electromagnetic thrust bearing system adapted to support a rotatable shaft against thrust loads directed parallel to the longitudinal axis of the shaft, the system comprising:

a rotor attached to the shaft for rotation therewith, the rotor having a plane perpendicular to the longitudinal axis of the shaft;

a stator element having first and second poles disposed adjacent the plane of the rotor, the first and second poles having pole faces parallel to the plane of the rotor, the pole faces including lips having a reduced cross-sectional area and extending toward the rotor, the lip of the first pole being adjacent the lip of the second pole, and wherein the stator includes first and second stator segments attached together, the first stator segment including a first leg disposed parallel to the shaft and an integral second leg radially extending from the first leg, the second stator segment including a radially outer leg parallel to the shaft, an integral leg extending radially inward from the radially outer leg, and a radially inner leg parallel to the shaft and extending from the radially extending leg, the first and second stator segments attached to form a channel having an L-shaped cross section, for holding an annular electromagnetic coil having an L-shape cross-section the first stator segment second leg being joined to the second stator segment radially outer leg.

15. The electromagnetic thrust bearing system of claim 14 further including an electromagnetic coil wound within and substantially filling the L-shaped channel, the electromagnetic coil therefore also having an L-shaped cross-section and maximizing the density of wire turns within the stator to increase the load carrying capacity of the bearing system.

16. The electromagnetic thrust bearing system of claim 14 wherein the electromagnetic coil is precision wound within the L-shaped channel.

17. The electromagnetic thrust bearing system of claim 14 wherein the first and second poles are positioned close together to reduce windage losses.

* * * * *

UNITED STATES PATENT AND TRADEMARK OFFICE
CERTIFICATE OF CORRECTION

PATENT NO. : 6,008,558
DATED : December 28, 1999
INVENTOR(S) : David G. Halsey, Shin Katsumata and Michael G. Schneider It is certified that error appears in the above-identified patent and that said Letters Patent is hereby corrected as shown below:

Column 1,
Line 8, insert the following:
-- This invention was made with government support under Contract No.: F33615-95-C-2509 with the United States Air Force. The government therefore has certain rights in this invention. --.

Signed and Sealed this

Thirty-first Day of January, 2006

JON W. DUDAS
*Director of the United States Patent and Trademark Office*